(12) United States Patent
Nowak et al.

(10) Patent No.: US 12,007,049 B2
(45) Date of Patent: Jun. 11, 2024

(54) METHOD FOR PRODUCING A PIPELINE ARRANGEMENT, AND PIPELINE ARRANGEMENT

(71) Applicant: Glatt Gesellschaft mit beschränkter Haftung, Binzen (DE)

(72) Inventors: Reinhard Nowak, Loerrach (DE); Jesko Jay Nowak, Loerrach (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 167 days.

(21) Appl. No.: 17/763,535

(22) PCT Filed: Jul. 17, 2020

(86) PCT No.: PCT/EP2020/070272
§ 371 (c)(1),
(2) Date: Mar. 24, 2022

(87) PCT Pub. No.: WO2021/058164
PCT Pub. Date: Apr. 1, 2021

(65) Prior Publication Data
US 2022/0341517 A1 Oct. 27, 2022

(30) Foreign Application Priority Data
Sep. 25, 2019 (DE) ...................... 10 2019 214 700.3

(51) Int. Cl.
*F16L 23/18* (2006.01)
*B25B 27/16* (2006.01)
(Continued)

(52) U.S. Cl.
CPC .............. *F16L 23/18* (2013.01); *B25B 27/16* (2013.01); *F16L 23/024* (2013.01); *F16L 23/04* (2013.01); *F16L 13/147* (2013.01)

(58) Field of Classification Search
CPC ......... F16L 23/18; F16L 23/22; F16L 17/067; F16L 17/08
See application file for complete search history.

(56) References Cited

U.S. PATENT DOCUMENTS 2,699,344 A * 1/1955 Bissell .................... F16L 23/18
285/341
3,047,937 A * 8/1962 De Vecchi ............. F16L 23/18
285/55

(Continued)

FOREIGN PATENT DOCUMENTS

CN 109282097 A * 1/2019 ............. F16L 23/18
DE 484005 C 10/1929
(Continued)

*Primary Examiner* — Matthew Troutman
*Assistant Examiner* — Fannie C Kee
(74) *Attorney, Agent, or Firm* — The Webb Law Firm (57) ABSTRACT

A method for manufacturing a pipe conduit arrangement including sticking a pipe stub onto a pipe conduit at least up to the flush state of the of the flange section end-face and the pipe conduit end-face, fixing the pipe conduit in the pipe stub in a press fit which is produced by the radial widening of the pipe conduit, and axially clamping the arisen pipe conduit units by way of clamping the flange sections of the pine stubs into the nine conduit arrangement. Also described is a pipe conduit arrangement.

11 Claims, 3 Drawing Sheets

(51) Int. Cl.
*F16L 23/024* (2006.01)
*F16L 23/04* (2006.01)
*F16L 13/14* (2006.01)

(56) References Cited

U.S. PATENT DOCUMENTS

| | | | |
|---|---|---|---|
| 3,398,978 A * | 8/1968 | Gasche | F16L 23/22 |
| | | | 285/368 |
| 3,455,583 A * | 7/1969 | Kenneth | F16L 23/22 |
| | | | 285/368 |
| 4,900,063 A | 2/1990 | Baarfusser et al. | |
| 5,749,586 A * | 5/1998 | Abe | F16L 23/22 |
| | | | 264/234 |
| 5,839,765 A * | 11/1998 | Carter | F16L 23/18 |
| | | | 285/332.2 |
| 7,107,662 B1 * | 9/2006 | Levario | F16L 23/18 |
| | | | 285/55 |
| 8,997,877 B2 | 4/2015 | Waldron et al. | |
| 10,145,498 B2 | 12/2018 | Shimizu | |
| 2010/0314865 A1 * | 12/2010 | Hatton et al. | F16L 23/18 |
| | | | 285/187 |
| 2014/0361535 A1 | 12/2014 | Lutz et al. | |

FOREIGN PATENT DOCUMENTS

| | | | | |
|---|---|---|---|---|
| DE | 2119547 A1 | 11/1971 | | |
| DE | 3806630 A1 | 9/1989 | | |
| DE | 19507854 A1 | 9/1995 | | |
| DE | 102010021834 A1 * | 12/2011 | | F16L 23/18 |
| EP | 1507111 A1 * | 2/2005 | | F16L 23/18 |
| GB | 692571 | 6/1953 | | |
| GB | 702806 | 1/1954 | | |
| JP | 49115712 U | 1/1948 | | |
| JP | 2001517287 A | 10/2001 | | |
| JP | 2013525696 A | 6/2013 | | |
| NO | 20131699 A1 * | 6/2015 | | F16L 23/18 |
| WO | 9837352 A1 | 8/1998 | | |
| WO | WO-2013042573 A1 * | 3/2013 | | F16L 23/18 |
| WO | WO-2014106630 A1 * | 7/2014 | | F16L 23/22 |
| WO | 2014192442 A1 | 12/2014 | | |

* cited by examiner

METHOD FOR PRODUCING A PIPELINE ARRANGEMENT, AND PIPELINE ARRANGEMENT

CROSS-REFERENCE TO RELATED APPLICATIONS

This application is the United States national phase of Inter-national Application No. PCT/EP2020/070272 filed Jul. 17, 2020, and claims priority to German Patent Application No. 10 2019 214 700.3 filed Sep. 25, 2019, the disclosures of which are hereby incorporated by reference in their entirety.

BACKGROUND

Field

The invention relates to a method for manufacturing a pipe conduit arrangement comprising two pipe conduit units which have a pipe conduit middle axis, wherein the pipe conduit unit comprises a pipe conduit which has a pipe conduit outer surface, a pipe conduit end-face and a pipe conduit outer diameter, and a pipe stub which has a pipe stub inner diameter and which comprises a flange section and a pipe section, said flange section comprising a flange section end-face and said pipe section comprising a pipe section inner surface, a seal which is arranged axially between the flange section end-faces of the pipe stubs and a clamping device which axially clamps the flange sections of the pipe stubs of the two pipe conduit units to one another.

Furthermore, the invention relates to a pipe conduit arrangement comprising two pipe conduit units which have a pipe conduit middle axis, wherein the pipe conduit unit comprises a pipe conduit which has a pipe conduit outer surface, a pipe conduit end-face and a pipe conduit outer diameter, and a pipe stub which has a pipe stub inner diameter, said pipe stub comprising a flange section and a pipe section, said flange section having a flange section end-face and said pipe section having a pipe section inner surface, to a seal which is arranged axially between the flange section end-faces of the pipe stubs and to a clamping device which axially clamps the flange sections of the pipe stubs of the two pipe conduit units to one another.

Related Art

Until now, pipe conduit arrangements which are subjected to pressure and are according to DIN 11864-3 have been realised by groove clamp stubs and collar clamp stubs, wherein these are each welded to a pipe conduit end. The welding seams of the pipe conduit arrangement which is subjected to pressure must subsequently be expensively post-treated and inspected. A seal, in particular an O-ring is inserted into the groove clamp stub. A clamping device connects the groove clamp stub and the collar clamp stub, wherein a mechanical stop which is arranged on the groove clamp stub ensures that the O-ring is pressed in a defined manner. On account of the pressing pressure, the O-ring is pressed partly out of the groove, so that a defined transition between the groove clamp stub and the collar clamp stub results in the inside of the pipe conduit arrangement.

According to a further pipe conduit arrangement which is manufactured according to DIN 32676, this is realised by two weld stubs which receive a seal. A disadvantage of this pipe conduit arrangement is the fact that the welding seams of the pipe conduit arrangement which is subjected to pressure subsequently needs to be expensively post-treated and inspected. Further disadvantageous is the fact that the seal has no defined pressing pressure, but this is determined by the clamping device.

SUMMARY

It is therefore the object of the invention to provide a method for manufacturing a pipe conduit arrangement, as well as a pipe conduit arrangement itself, wherein a post-treatment and inspection of the weld seams of the pipe conduit arrangement which is subjected to pressure is not necessary.

Concerning a method of the initially mentioned type, this object is achieved by way of the pipe stub being stuck onto the pipe conduit at least up to the flush state of the flange section end-face and the pipe conduit end-face, the pipe conduit being fixed in the pipe stub in a press fit which is produced by the radial widening of the pipe conduit and the arisen pipe conduit units being axially clamped into the pipe conduit arrangement by way of clamping the flange sections of the pipe stubs. The advantage of the preferred method lies in the fact that the manufactured pipe arrangement represents a simple connection of two pipe conduit units. By way of this, the costs and the working steps are reduced on manufacture of the pipe conduit arrangement. Furthermore, the post-machining which conventionally arises with connection technology of pipe conduit arrangements, for example due to the welding offset, is not necessary with the new method for manufacturing the pipe conduit arrangement. On account of manufacturing tools which are autonomous in location, the manufacture can also be independent of the location, by which means a dependency for example on surrounding air and humidity which is of central importance on welding is eliminated.

According to a further development of the method which is advantageous in respect of this, the pipe conduit and the pipe stub are provided, wherein the pipe conduit outer diameter is larger than the pipe stub inner diameter, so that a press fit is produced directly on sticking the pipe stub onto the pipe conduit. On account of the press fit, an improved non-positive connection between the pipe conduit and the pipe stub is created. Preferably, before sticking the pipe stub onto the pipe conduit, the pipe stub is heated and/or the pipe conduit cooled or vice versa. A simpler press joining of the pipe conduit and the pipe stub is rendered possible by way of this.

Further preferably, the pipe section inner surface and/or the pipe conduit outer surface is at least partly structured before the radial widening of the pipe conduit, so that directly after a press fit which is produced by a radial widening of the pipe conduit, the pipe conduit is also positively fixed in the pipe stub. By way of a structuring of the at least partial pipe section inner surface and/or the pipe conduit outer surface, for example by way of grooves and prominences in the different patterns, apart from the positive fit which is achieved by the widening of the pipe conduit, additionally yet a non-positive fit is effected and thus a higher quality connection between the pipe conduit and the pipe stub.

Furthermore, given an additional advantageous embodiment of the method, after the clamping of the pipe conduit units into the pipe conduit arrangement, the seal forms a defined transition between the two pipe conduit units which are clamped to one another, so that a collection of residue of the medium which flows through the pipe conduit arrangement does not take place. The seal is preferably designed as a flat seal. Materials such as e.g., elastomers, press fibres, aramide fibres, carbon fibres, mineral fibres, metal and copper are available as a sealing material.

Encased seals, in particular encased flat seal are preferred, wherein these comprise a core which is enveloped by a PTFE sleeve or metal sleeve, for example steel or corrosion resistant nickel alloys (arbitrary flat seal material for example fibre composite, PTFE etc). The encasing protects the core from a chemical attack by the medium which is to be sealed off.

According to an advantageous further development of the method, the seal comprises a seal insert which is configured to define an axial minimum distance between the two pipe conduit units during the clamping of the pipe conduit units into the pipe conduit arrangement. The setting of an axial minimal distance between the two pipe conduit units by way of the seal which comprises a seal insert has the advantage that the maximal pressing pressure of the sealing surface can be defined. Furthermore, post machining of the pipe conduit units, in particular of the pipe in respect to this can be done away with by way of the minimum distance between the two pipe conduit units on account of the sealing insert, said minimum distance not being able to be exceeded.

Moreover, the object of the initially mentioned type is achieved by way of the pipe stub being stuck onto the pipe conduit at least up to the flush state of flange section end-face and the pipe conduit end-face and the pipe conduit being fixed in the pipe stub by way of a press fit which is produced by a radial widening of the pipe conduit. The preferred pipe conduit arrangement has the advantage that the manufactured pipe arrangement represents a simple connection of two pipe conduit units, by which means costs as well as working steps can be reduced on manufacturing the pipe conduit arrangement. With regard to prior connection technology of pipe conduit arrangements, for example a post-machining of the pipe conduit arrangement occurs, for example due to a possible welding offset and such post-machining is done away with concerning the preferred pipe conduit arrangement. Furthermore, the method for manufacturing the pipe conduit arrangement is not spatially fixed compared to the manufacturing methods which have been known up to now and can therefore be carried out anywhere.

Preferably, the pipe stub is stuck onto the pipe conduit in a manner such that the pipe stub is inserted through the pipe conduit by a length of 0.5 mm to 2 mm, particularly preferably 0.5 mm to 1 mm. Thus, the flange section end-face and the pipe conduit end-face are not arranged in a flush manner but offset to one another. Such an arrangement has the advantage that the pipe conduit end-faces given the clamping of the pipe conduit units by way of the clamping device are subjected to a higher surface pressing force in comparison to a flush arrangement of the flange section end-face and the pipe conduit end-face. A greater sealedness is achieved by way of this.

In a preferred embodiment of the pipe conduit arrangement, the pipe conduit outer diameter and the pipe stub inner diameter are designed to create a press fit on sticking the pipe stub onto the pipe conduit. On account of the press fit, an improved non-positive fit connection between the pipe conduit and the pipe stub is created. Preferably, the pipe stub is heated and/or the pipe conduit is cooled or vice versa before the sticking of the pipe stub onto the pipe conduit. By way of this, a simpler press-joining of the pipe conduit and pipe stub is rendered possible.

Further advantageously, the pipe section inner surface and/or the pipe conduit outer surface are at least partly structured, so that the pipe conduit is also positively fixed in the pipe stub in at press fit which is created by the radial widening of the pipe conduit. On account of a structuring of the at least partial pipe section inner surface and/or the pipe conduit outer surface, for example by way of grooves and prominences in the most varied of patterns, apart from the positive fit which is achieved by the widening of the pipe conduit, additionally yet a non-positive fit is effected and thus a higher-quality connection between the pipe conduit and the pipe stub.

Advantageously, the clamping device is designed as a joint chamber. By way of this, the pressing pressure which acts upon the two pipe conduit units can be set in a variable manner. Furthermore, such a clamping device is inexpensive. The clamping device can also be designed as a flange-screw connection.

According to an additional advantageous further development of the pipe conduit arrangement, the seal is configured in order to form a defined transition between the two pipe conduit units which are clamped to one another, so that a connection of residues of the medium which flows through the pipe conduit arrangement or of the media which flow through the pipe conduit arrangement does not take place.

According to a further preferred embodiment of the pipe conduit arrangement, the seal comprises a seal insert which is configured in order to define an axial minimum distance between the two pipe conduits units. The setting of an axial minimum distance by way of the seal between the two pipe conduit units, said seal comprising the seal insert, is advantageous since the maximal pressing force of the sealing surface can be set. Furthermore, post-machining of the pipe conduit units, in particular of the pipes in respect to this can be done away with due to the minimal distance between the two pipe conduit units, said minimum distance not being able to be exceeded.

Preferably, the seal insert comprises a seal insert end-face which is designed as a stop. A seal insert end-face which is designed as a stop permits a simple realisation for limiting the minimum distance between the two pipe conduit units which are to be clamped.

BRIEF DESCRIPTION OF THE DRAWINGS

Hereinafter, the invention is explained in more detail by way of the accompanying drawing. This shows in.

DETAILED DESCRIPTION

Figure 1:
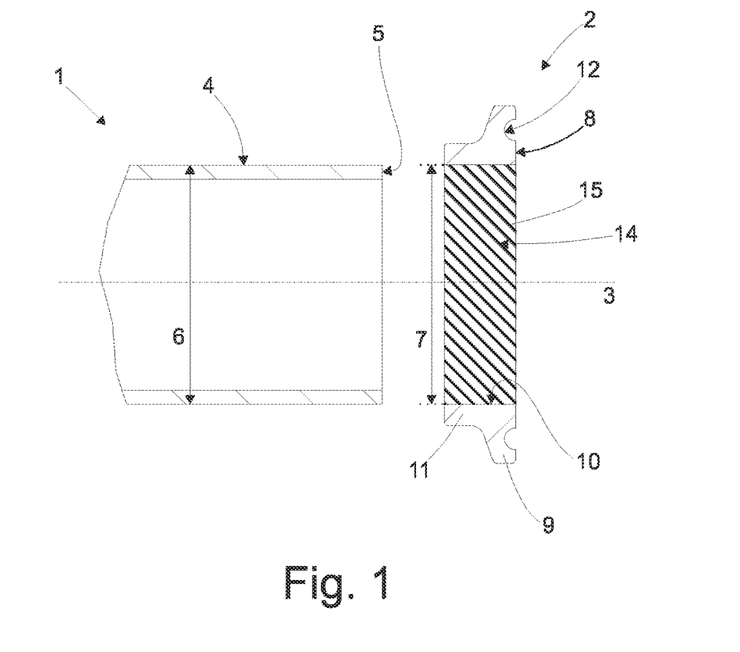
FIG. 1 a sectioned representation of a pipe conduit and a pipe stub.

A sectioned representation of a pipe conduit 1 and of a pipe stub 2 is shown in FIG. 1, wherein the pipe conduit 1 and the pipe stub 2 comprise a pipe conduit middle axis 3 and is aligned on this.

The pipe conduit 1 comprises a pipe conduit outer surface 4, a pipe conduit end-face 5 and a pipe conduit outer diameter 6. Furthermore, the pipe conduit 1 is designed according to a specification with respect to a pipe length and a pipe bend, wherein a straight pipe conduit 1 is used in the representation of FIG. 1.

The pipe stub 2 has a pipe stub inner diameter 7 and comprises a flange section 9 which comprises a flange section end-face 8 and a pipe section 11 which comprises a pipe section inner surface 10. A groove 12 for the partial receiving of a seal 13 which is not shown here is formed in the flange section end-face 8 of the flange section 9.

The seal 13 is preferably designed as a flat seal, wherein materials such as e.g., elastomers, press fibres, aramide fibres, carbon fibres, mineral fibres, metal and copper are available as a seal material. Encased seals 13, in particular encased flat seals are also preferred, wherein these comprise a core which is enveloped by a PTFE sleeve or metal sleeve, preferably steel or corrosion-resistant nickel alloys (arbitrary flat seal material or fibre composite, PTFE etc.). The encasing protects the core from a chemical attack by the medium to be sealed.

Furthermore, the pipe section inner surface 10 has a structure 14 in the form of prominences 15.

Figure 2:
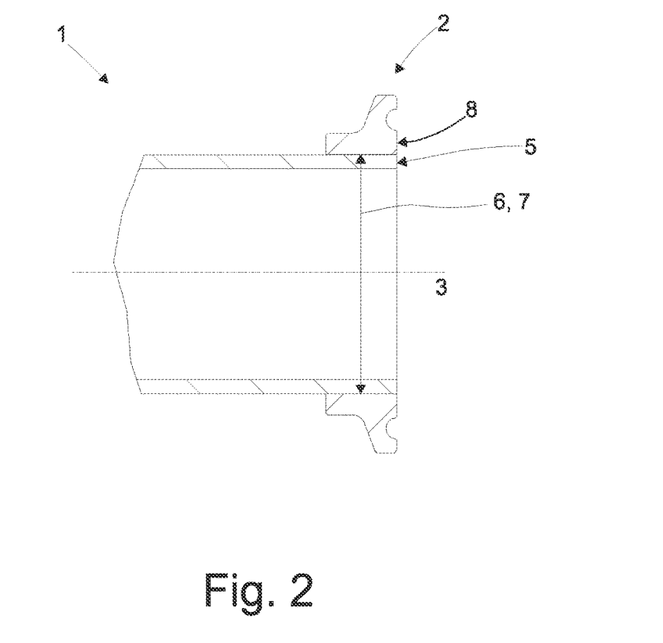
FIG. 2 a sectioned representation of the pipe conduit and of the pipe stub, wherein the pipe stub is stuck axially onto the pipe conduit, FIG. 3 a sectioned representation of a pipe conduit unit, FIG. 4 a sectioned representation of two pipe conduit units, wherein a seal is arranged between the pipe conduit units, FIG. 5 a sectioned representation of an embodiment example of a pipe conduit arrangement, said representation having detail A in the region of two pipe conduit units which are clamped to one another and FIG. 6 a detailed view of the section A which is represented in FIG. 5, in the region of the pipe conduit units which are clamped to one another.

A sectioned representation of the pipe conduit 1 and the pipe stub 2 is represented in FIG. 2, wherein the pipe stub 2 is axially stuck onto the pipe conduit 1 in the axis direction of the pipe conduit middle axis 3. The flange section end-face 8 and the pipe conduit end-face 5 are hereby aligned flushly to one another in the embodiment example. The pipe conduit outer diameter 6 and the pipe stub inner diameter 7 are equally large in the embodiment example.

In another embodiment example which is not shown, the pipe conduit outer diameter 6 of the pipe conduit 1 is larger than the pipe stub inner diameter 7 of the pipe stub 2. Thus, a press fit is created generated directly on axially sticking the pipe is stub 2 onto the pipe conduit 1. Such a press fit creates a non-positive connection of the pipe conduit 1 and pipe stub 2.

Figure 3:
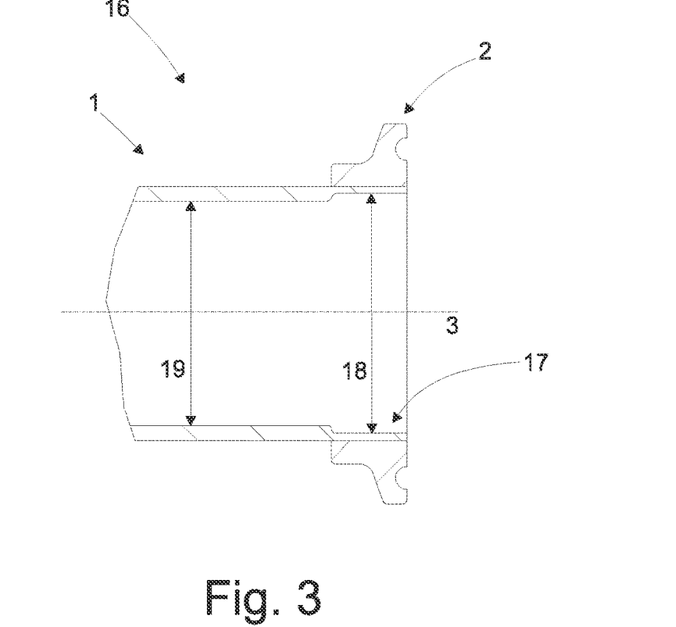

A sectioned representation of a pipe conduit unit 16 is shown in FIG. 3. The pipe conduit unit 16 comprises a pipe stub 2 which is axially stuck onto the pipe conduit 1. In contrast to the arrangement which is represented in FIG. 2, in the pipe conduit unit 16, the pipe conduit 1 is fixed in the pipe stub 2 by way of a press fit 17 by way of radial widening, in particular of the pipe conduit walls. The pipe stub 2 is therefore connected to the pipe conduit 1 with a non-positive fit.

The radial widening is achieved by way of tool, in particular single-roller tool and is also denoted as a final tube expansion of the pipe conduit 1. After the radial widening, a cross-sectional-area of the pipe conduit 1 in the region of the widening is larger than an initial cross-sectional area of the pipe conduit 1. Thus, due to the radial widening of the pipe conduit 1, the widened pipe conduit inner diameter 18 in the region of an overlapping of the pipe stub 2 and pipe conduit 1 is larger than the original pipe conduit diameter 19.

On account of the structure 14 which is arranged on the pipe section inner surface 10 in the form of prominences 15, due to the widening of the pipe conduit 1, apart from a non-positive connection, a positive connection between the pipe conduit 1 and the pipe stub 2 is also created. The structure 14 can also be designed in another form, for example as a groove or the like.

In another embodiment which are not represented, the pipe section inner surface 10 and/or the pipe conduit outer surface 4 is at least partly structured before the radial widening of the pipe conduit 1.

Figure 4:
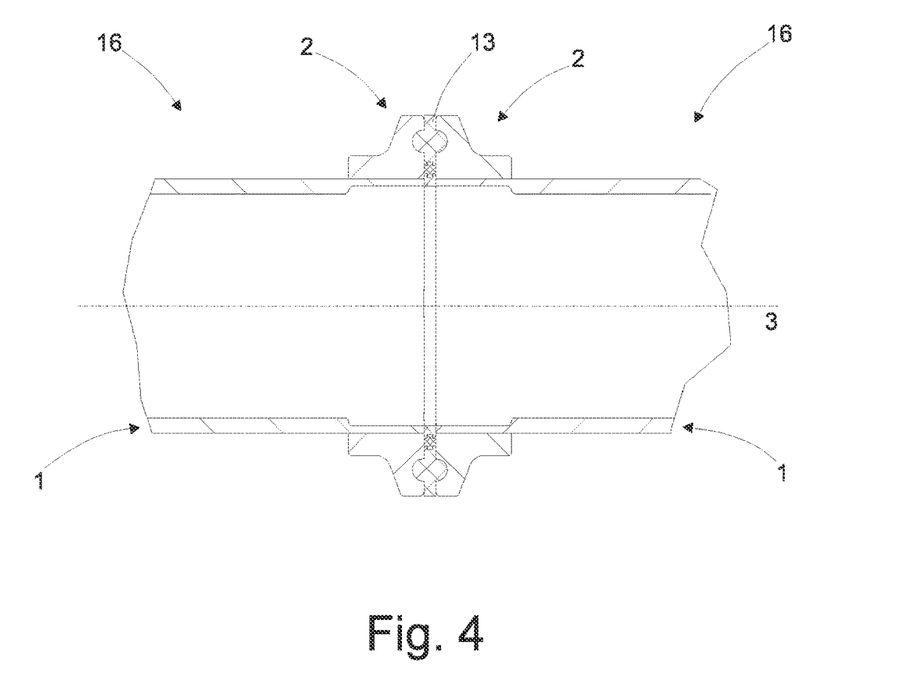

FIG. 4 represents a sectioned representation of two pipe conduit units 16, wherein a seal 13 which comprises a seal insert 20 is arranged axially between the pipe conduit units 16.

Figure 5:
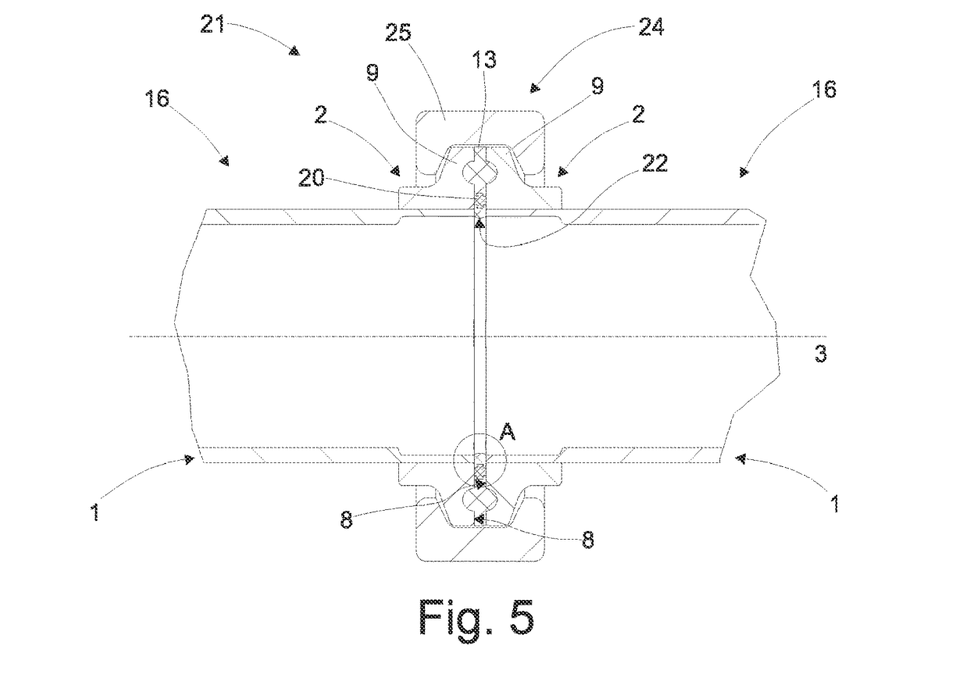

FIG. 5 shows a sectioned representation of an embodiment example of a pipe conduit arrangement 21, said representation comprising a detail A in the region of two pipe conduit units 16 which are clamped to one another.

The pipe conduit arrangement 21 comprise a seal 13 which is arranged axially between the flange section end-faces 8 of the pipe stub 2 which are formed on the flange sections 9. The seal 13 is configured in order to form a defined transition 22 between the two pipe conduit units 16 which are clamped to one another. The defined transition 22 is formed by the pressing forces which act upon the seal 13 on clamping.

Figure 6:
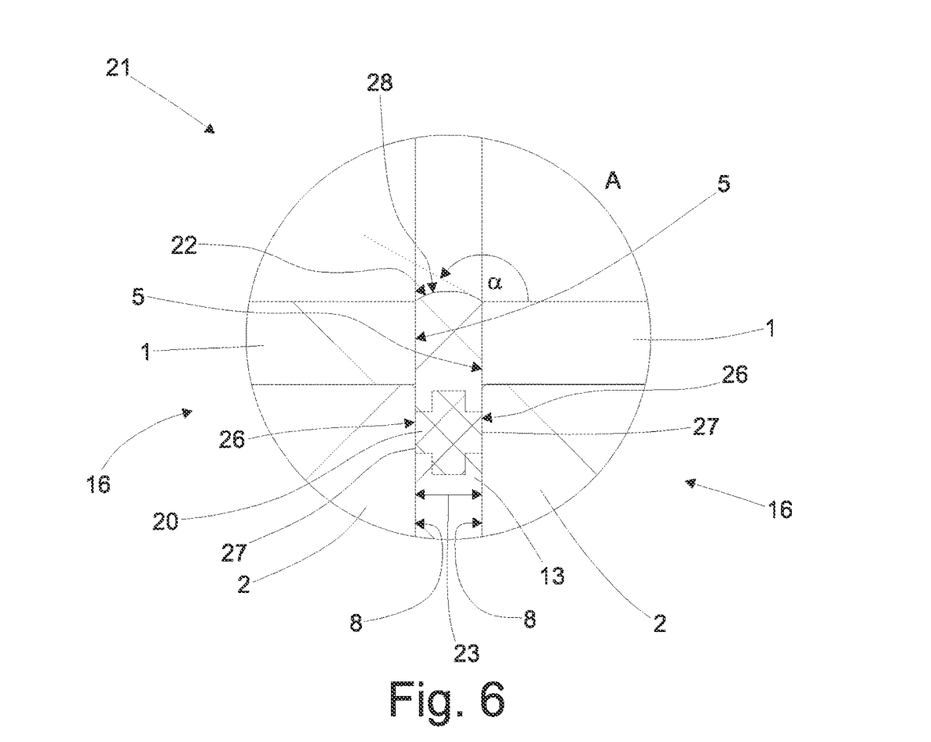

A subsequently described detailed view of the pipe conduit units 16 which are clamped to one another in the detail A of FIG. 6 shows the defined transition 22. A collecting of residues or an accumulation of solid matter of the medium which flows through the pipe conduit arrangement 21 or of the media which flow through the pipe conduit arrangement 21 is reduced or does not take place due to the defined transition 22.

Furthermore, the seal 13 comprises seal insert 20. An axial minimum distance 23 between the two pipe conduit units 16 is defined by the seal insert 20, so that the two pipe conduit units 16 on clamping the pipe conduit arrangement 21 are subjected to pressing forces which are fixed due to the axial minimum distance 23 which is set due to the seal insert 20.

The pipe conduit arrangement 21 is axial clamped by way of a clamping device 24. For this, the flange sections 9 of the pipe stubs 2 of the two pipe conduit units 16 are axially clamped to one another by way of a clamping device. In the embodiment example, the clamping device 24 is advantageously designed as a joint chamber 24. Due to the clamping device 24 which is designed as a joint chamber 25, the pressing forces which act upon the seal 13 and which correspond to a pressing force related to the surface can be additionally set e.g. by way of a winged nut or the like which closes the joint chamber 25. The clamping device 24 can also be designed as a flange-screw connection.

Alternatively, standard parts, such as for example measuring instruments, valves and flaps or the like can herein also serve as a pipe conduit unit 16 or together with another second pipe conduit unit 16 can form a pipe conduit arrangement 21.

A detailed view of the detail A which is represented in FIG. 5, in the region of the pipe conduit units 16 which are clamped to one another, is represented in FIG. 6.

The seal insert 20 of the seal 13 comprises a seal insert end-face 27 which is designed as a stop 26. Due to the seal insert 20, thus an axial minimum distance 23 between the two pipe conduit units 16 is definable or defined. The pipe conduit end-faces 5 and/or the flange section end-faces 8 in the clamped state of the pipe conduit arrangement 21 are adjacent to the seal insert end-faces 27 of the seal insert 20 of the seal 13. By way of this, the minimum distance 23 between the two pipe conduit units 16 of the pipe conduit arrangement 21 and thus also the pressing forces which act upon the seal 13 can be set in a precise manner.

The transition 22 which is defined by the pressing forces which are set by the seal insert 20 is preferably designed such that the arching 28 with respect to a pipe conduit inner diameter 18 forms an obtuse angle α. Particular preferably, the obtuse angle α is an angle α between 100° and 170°, very particularly preferably between 120° and 150°. By way of this, one succeeds in residues of the medium which flows through the pipe conduit arrangement 21 or the media which flows through the pipe conduit arrangement 21 being reduced or prevented.

The preferred method for manufacturing the pipe conduit arrangement 21 comprising two pipe conduit units 16 which have a pipe conduit middle axis 3, wherein the pipe conduit unit 16 comprises a pipe conduit 1 which has a pipe conduit outer surface 4, a pipe conduit end-face 5 and a pipe conduit outer diameter 6, and a pipe stub 2 which has a pipe stub inner diameter 7 and which comprises a flange section 9 and a pipe section 11, said flange section comprising a flange section end-face 8 and said pipe section comprising a pipe section inner surface 10, a seal which is arranged axially between the flange section end-faces 8 of the pipe stubs 2, and a clamping device 24 which axially clamps the flange sections 9 of the pipe stubs 2 of the two pipe conduit units 16 to one another, wherein a) the pipe stub 2 is stuck onto the pipe conduit 1 at least up to flush state of the flange section end-face 8 and the pipe conduit end-face 5, b) the pipe conduit 1 is fixed in the pipe stub 2 in a press fit 17 which is generated by a radial widening of the pipe conduit 1 and c) the arisen pipe conduit units 16 are axially clamped into the pipe conduit arrangement 21 by clamping the flange sections 9 of the pipe stubs 2.

Preferably, but not represented, the pipe stub 2 is stuck onto the pipe conduit 1 in a manner such that the pipe stub 2 is stuck through the pipe conduit 1 with a length of 0.5 mm to 0.2 mm, particularly preferably 0.5 mm to 1 mm. Thus, the flange section end-face 8 and the pipe conduit end-face 5 are not aligned flushly to one another but are arranged offset to one another. By way of this, the pipe conduit end-faces 5 on clamping the pipe conduit units 16 by way of the clamping device 24 are subjected to a higher surface pressing compared to a flush arrangement of flange section end-face 8 and pipe conduit end-face 5, so that a greater sealedness is achieved.

Preferably, the pipe stub 2 is heated and/or the pipe conduit 1 cooled before sticking the pipe stub 2 onto the pipe conduit 1. A cooling of the pipe stub 2 and/or a heating of the pipe conduit 1 can also be carried out.

The invention claimed is:

1. A method for manufacturing a pipe conduit arrangement comprising two pipe conduit units which have a pipe conduit middle axis, wherein each pipe conduit unit comprises a pipe conduit which has a pipe conduit outer surface, a pipe conduit end-face and a pipe conduit outer diameter, and a pipe stub which has a pipe stub inner diameter and which comprises a flange section and a pipe section, said flange section comprising a flange section end-face and said pipe section comprising a pipe section inner surface, and a seal which is arranged axially between the flange section end-faces of the pipe stubs, and a clamping device which axially clamps the flange sections of the pipe stubs of the two pipe conduit units to one another, the method comprising:

forming each of the pipe conduit units, wherein forming each of the pipe conduit units comprises, for each of the pipe conduit units:
sticking the pipe stub onto the pipe conduit at least up to a flush state of the flange section end-face and the pipe conduit end-face; and
fixing the pipe conduit in the pipe stub in a press fit which is produced by the a radial widening of the pipe conduit; and
axially clamping the formed pipe conduit units to one another by way of clamping the flange sections of the respective pipe stubs into the pipe conduit arrangement,
wherein the seal comprises a seal insert and after the clamping of the formed pipe conduit units into the pipe conduit arrangement, the seal forms a transition between the pipe conduit units which are clamped to one another, and
wherein the transition is defined by pressing forces which are set by the seal insert such that an arching with respect to a pipe conduit inner diameter forms an obtuse angle.

2. The method according to claim 1, wherein, for each of the pipe conduit units, the pipe conduit and the pipe stub are provided, wherein the pipe conduit outer diameter is larger than the pipe stub inner diameter, so that the press fit is produced directly on sticking the pipe stub onto the pipe conduit.

3. The method according to claim 1, wherein, for each of the pipe conduit units, before sticking the pipe stub onto the pipe conduit, the pipe stub is heated and/or the pipe conduit is cooled or vice versa.

4. The method according to claim 1, wherein, for each of the pipe conduit units, the pipe section inner surface and/or the pipe conduit outer surface is at least partly structured, before the radial widening of the pipe conduit, so that directly after the press fit which is created by the radial widening of the pipe conduit, the pipe conduit is also positively fixed in the pipe stub.

5. The method according to claim 1, wherein the seal insert is configured to define an axial minimum distance between the two pipe conduit units during the clamping of the pipe conduit units into the pipe conduit arrangement.

6. A pipe conduit arrangement, comprising:
two pipe conduit units which have a pipe conduit middle axis, wherein each pipe conduit unit comprises:
a pipe conduit which has a pipe conduit outer surface, a pipe conduit end-face, and a pipe conduit outer diameter; and
a pipe stub which has a pipe stub inner diameter and which comprises a flange section and a pipe section, said flange section having a flange section end-face and said pipe section having a pipe section inner surface;
a seal which is arranged axially between the flange section end-faces of the pipe stubs; and
a clamping device which axially clamps the flange sections of the pipe stubs of the two pipe conduit units to one another,
wherein, for each pipe conduit unit, the pipe stub is stuck onto the pipe conduit at least up to the flush state of the flange section end-face and the pipe conduit end-face,
wherein, for each pipe conduit unit, the pipe conduit is fixed in the pipe stub in a press fit which is produced by the radial widening of the pipe conduit,
wherein the seal comprises a seal insert and after the clamping of the formed pipe conduit units into the pipe conduit arrangement, the seal forms a transition between the pipe conduit units which are clamped to one another, and
wherein the transition is defined by pressing forces which are set by the seal insert such that an arching with respect to a pipe conduit inner diameter forms an obtuse angle.

7. The pipe conduit arrangement according to claim 6, wherein, for each of the pipe conduit units, the pipe conduit outer diameter and the pipe stub inner diameter are designed in order to create the press fit on sticking the pipe stub onto the pipe conduit.

8. The pipe conduit arrangement according to claim 6, wherein, for each of the pipe conduit units, the pipe section inner surface and/or the pipe conduit outer surface is at least partly structured, so that the pipe conduit is also positively fixed in the pipe stub in the press fit which is created by a radial widening of the pipe conduit.

9. The pipe conduit arrangement according to claim 6, wherein the clamping device is designed as a joint chamber.

10. The pipe conduit arrangement according to claim 6, wherein the seal insert is configured to define an axial minimum distance between the two pipe conduit units.

11. The pipe conduit arrangement according to claim 10, wherein the seal insert comprises a seal insert end-face which is designed as a stop.

\* \* \* \* \*

UNITED STATES PATENT AND TRADEMARK OFFICE
CERTIFICATE OF CORRECTION

PATENT NO. : 12,007,049 B2
APPLICATION NO. : 17/763535
DATED : June 11, 2024
INVENTOR(S) : Reinhard Nowak et al.

Page 1 of 1

It is certified that error appears in the above-identified patent and that said Letters Patent is hereby corrected as shown below:

On the Title Page

Column 2, item (57) Abstract, Line 3, delete "of the of the" and insert -- of the --

Column 2, item (57) Abstract, Line 8, delete "pine" and insert -- pipe --

Column 2, item (57) Abstract, Line 8, delete "nine" and insert -- pipe --

In the Claims

Column 8, Line 2, Claim 1, delete "by the" and insert -- by --

Signed and Sealed this
Twenty-seventh Day of August, 2024

Katherine Kelly Vidal
*Director of the United States Patent and Trademark Office*